March 8, 1949.  G. A. WARD  2,463,926
TRAILER DOLLY
Filed Nov. 19, 1947  2 Sheets-Sheet 1
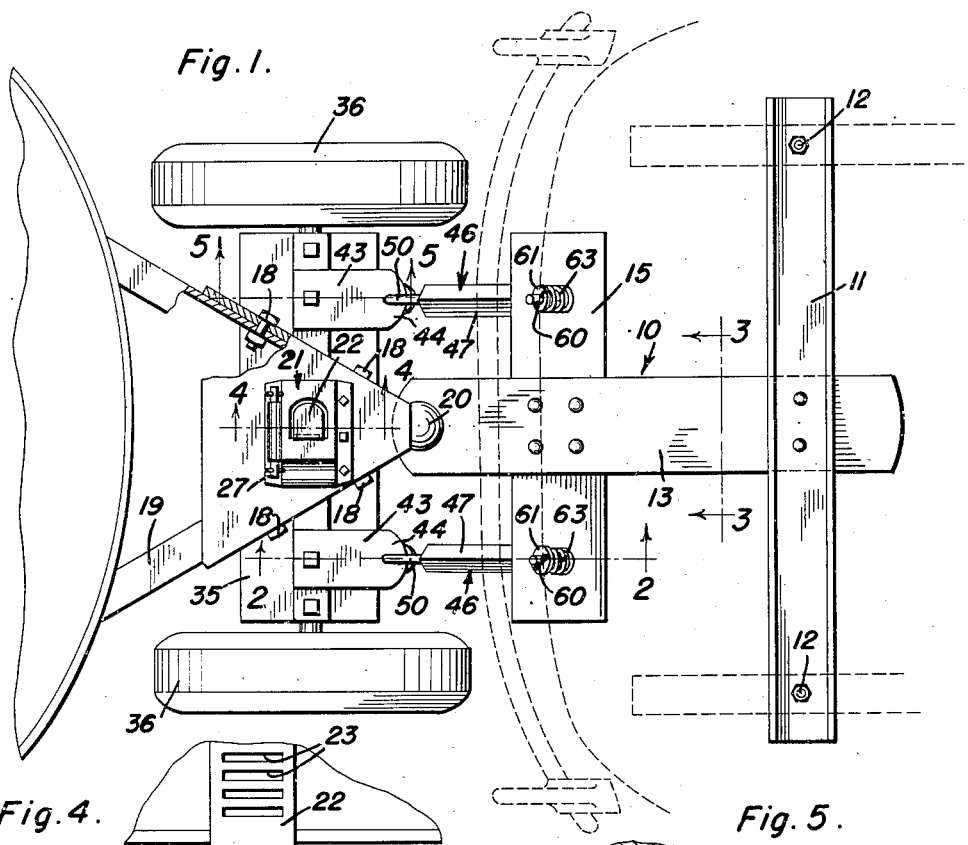
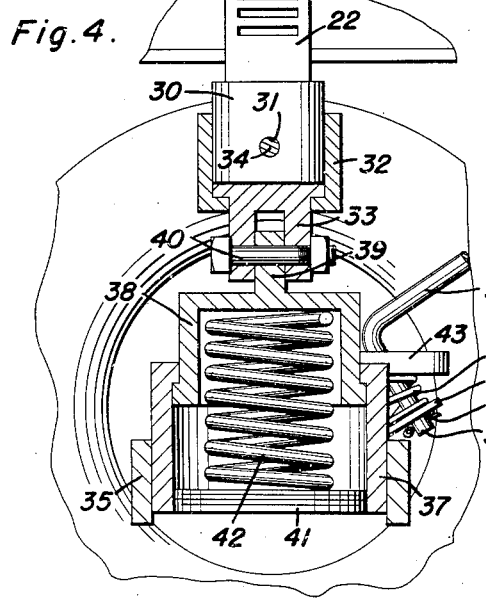
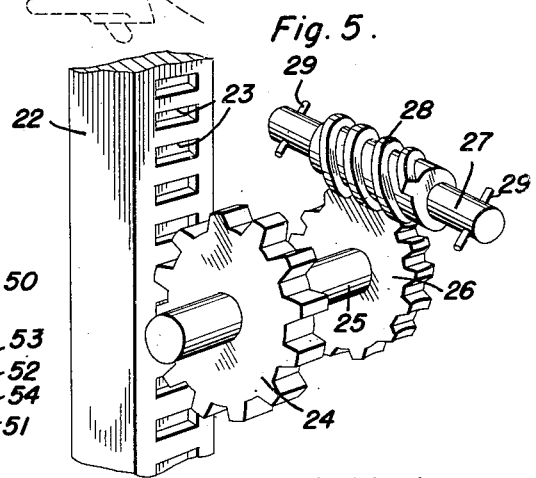
George A. Ward
INVENTOR.

March 8, 1949.  G. A. WARD  2,463,926
TRAILER DOLLY
Filed Nov. 19, 1947  2 Sheets-Sheet 2
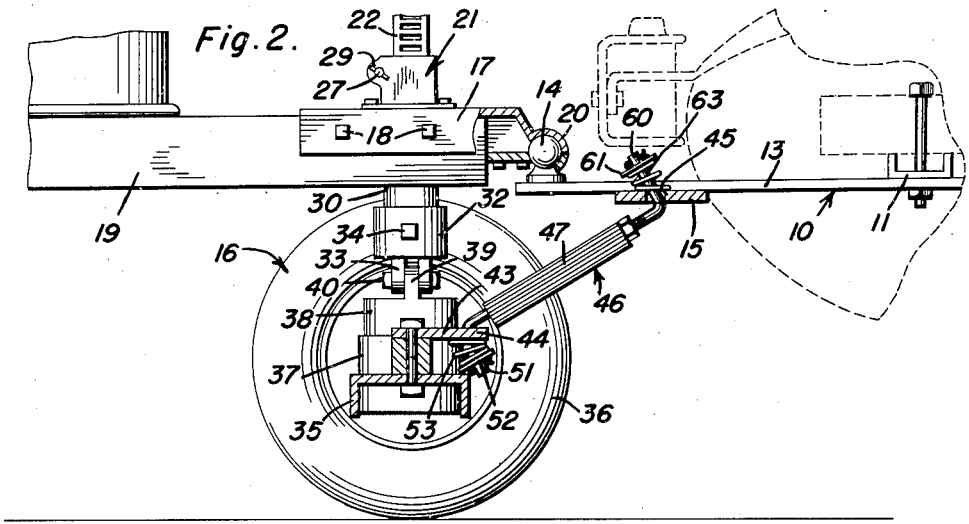
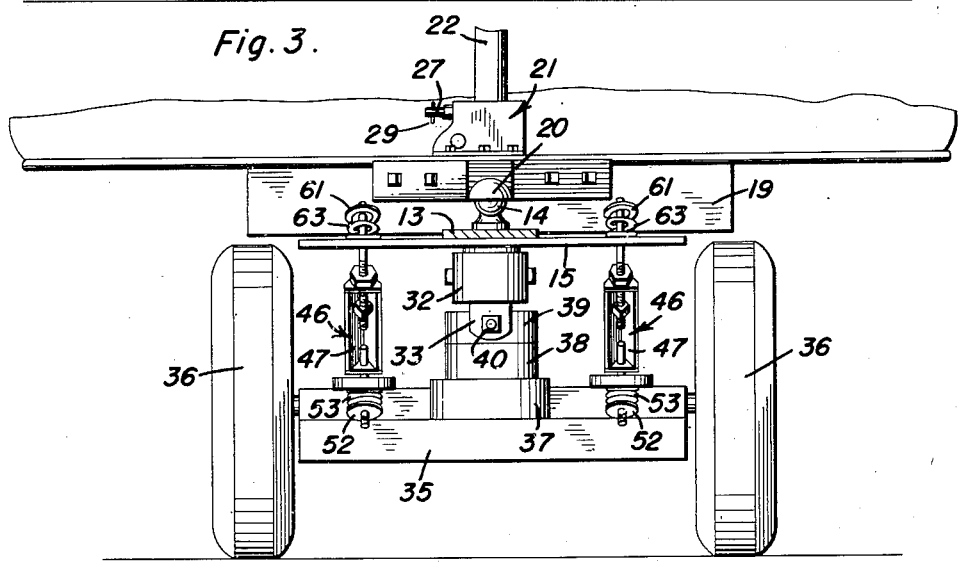
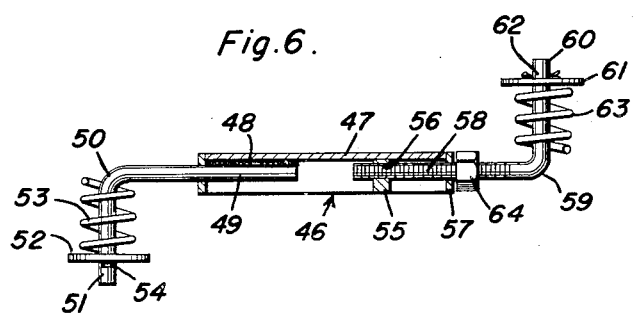
George A. Ward
INVENTOR.

Patented Mar. 8, 1949

2,463,926

UNITED STATES PATENT OFFICE 2,463,926

TRAILER DOLLY

George A. Ward, Rome, N. Y.

Application November 19, 1947, Serial No. 786,827

2 Claims. (Cl. 280—33.44)

This invention relates to a trailer dolly and has for its primary object to support the forward end of a trailer such as is commonly attached to a motor driven traction vehicle such as a private passenger car.

Another object is to regulate the weight imposed upon the traction wheels of a traction vehicle, thereby to govern the tractive force of the traction wheels.

A further object is to improve the handling of the trailing vehicle and prevent what is commonly referred to as "jack-knifing" when the vehicles are being driven in a reverse direction.

Still another object of the invention is to assure the proper tracking of the trailing vehicle and avoid side sway thereof during its movement in a forward direction.

The above and other objects may be attained by employing this invention which embodies among its features a jack having a downwardly movable load sustaining column, means to mount the jack on the draft tongue of a trailer and a wheeled carriage at the lower end of the column upon which the load on the draft tongue is adapted to be carried.

Other features include mounting the carriage to rock about an axis which lies in a vertical plane coincident with the longitudinal axis of the trailer, a draw bar adapted to be connected to a traction vehicle, a coupling member on the draw bar and a mating coupling member on the draft tongue to cooperate with the coupling member on the draw bar to establish a towing connection between the traction vehicle and the trailer.

Still other features include a cross member on the draw bar and a link connected to the cross member adjacent each end and to the carriage on opposite sides of the longitudinal axis of the dolly so that as the draft vehicle turns, the carriage of the dolly will be rotated about the vertical axis of the column.

In the drawings,

Figure 1 is a top plan view of a dolly and draw bar embodying the features of this invention;

Figure 2 is a longitudinal sectional view taken substantially along the line 2—2 of Figure 1;

Figure 3 is a transverse sectional view taken substantially along the line 3—3 of Figure 1;

Figure 4 is a fragmentary enlarged detail view taken substantially along the line 4—4 of Figure 1;

Figure 5 is a perspective view of the jack controlling mechanism for moving the column vertically, and;

Figure 6 is an enlarged sectional view through one of the steering control links.

Referring to the drawings in detail a draw bar designated generally 10 comprises a cross member 11 which is adapted to be bolted or otherwise coupled as at 12 to the frame or axle of a traction vehicle of conventional form such as a passenger vehicle. As illustrated in Figure 1, the cross member 11 of the draw bar 10 is provided with a rearwardly extending bar 13 carrying adjacent its rear end a ball head 14 forming one element of a conventional trailer coupling. Fixed to the bar 13 near its rear end, and slightly in advance of the head 14 is a cross bar 15 which extends perpendicular to the longitudinal axis of the bar 13, the longitudinal axis of which lies in a plane coincident with the longitudinal axis of the traction vehicle.

The front supporting dolly of the trailing vehicle is designated generally 16, and comprises a conventional connecting member 17 of any suitable form which is adapted to be coupled as by bolts 18 to the frame 19 of the trailing vehicle. This member 17 is provided at its forward end with a spherical socket 20 which is adapted to receive the ball head 14 in a conventional manner in order to establish a towing connection between the traction vehicle and the trailer.

Carried by connecting member 17 is a jack designated generally 21 through which a load sustaining column 22 is mounted to move vertically. This column is provided along one longitudinal side with longitudinally spaced rack teeth 23 having meshing engagement with a driving pinion 24. The pinion 24 is mounted on a drive shaft 25 which is mounted to rotate about a horizontal axis in the case of the jack 21, and carries adjacent one end a worm gear 26. Mounted in the case of the jack 21 to rotate about an axis which lies perpendicular to the axis of the drive shaft 25 is a shaft 27 carrying a worm 28 which meshes with the worm gear 26 and is provided adjacent each end with a cross pin 29 for engagement by a conventional jack actuating handle, so that upon rotation of the shaft 27, the column 22 may be raised or lowered. The lower end of the column is provided with an enlarged head 30 which is provided with a transversely extending aperture 31 for a purpose to be more fully hereinafter described. The head 30 on the lower end of the column 22 is seated in a socket 32 from the bottom of which projects a clevis 33, and extending transversely through the socket and the opening 31 in the head 30 is a cross pin 34 by which the socket and clevis are fixed to the head.

The carriage 16 above referred to also includes an axle member 35 carrying at opposite ends spindles upon which wheels 36 are mounted to rotate. Supported intermediate the ends of the axle 35 is a socket member 37, and telescopically entering the upper end of the socket member is an inverted socket member 38 carrying an upstanding ear 39 which is adapted to fit within the clevis 33, and to be coupled thereto for rocking motion by a means of a pin or bolt 40, the longitudinal axis of which lies in a plane coincident with the longitudinal axis of the trailer vehicle. A plug 41 closes the lower end of the socket member 37, and seated on the plug is one end of a compression coil spring 42, the opposite end of which engages the underside of the socket member 38 in order yieldingly to hold the parts in extended position as illustrated in Figure 4. It will thus be seen that the weight of the forward end of the trailer vehicle will be transmitted to the axle 35 through the medium of the spring 42, thereby affording a cushion between the wheels 36 and the frame 19. A suitable arm 43 is fixed to the axle member 35 adjacent each end, and each arm 43 is provided with an aperture 44 the purpose of which will be more fully hereinafter explained.

Formed in the cross bar 15 adjacent each end thereof is an opening 45 for the reception of one end of a coupling link designated generally 46. Each coupling link above referred to comprises a channel member 47 between the legs of which is welded or otherwise fixed as at 48 one end 49 of a hook 50. The opposite end 51 of the hook 50 projects perpendicularly from the end 49 and has fitted thereover a washer 52 forming an abutment for one end of a compression coil spring 53. The washer 52 is held in place by a conventional cotter pin 54 and thus may be removed from the end 51 of the hook 50 during the connecting or disconnecting of the link 46 with its respective bracket 43. Welded or otherwise attached to the member 47 intermediate its ends is a bridge piece 55 which is provided with an internally screw threaded opening 56, the axis of which lies parallel to the longitudinal axis of the member 47. An end member 57 is fixed to the adjacent end of the member 47 and is provided with an opening which aligns with the threaded opening 56 for the reception of the threaded end 58 of a hook 59 the opposite end 60 of which lies perpendicular to the threaded end 58 and carries a washer 61 which like the washer 52 is removably held in place thereon by means of a cotter pin 62. The washer 61 also serves as an abutment for one end of a compression coil spring 63, and threaded on the threaded end 58 of the hook 59 is a jamb nut 64 which is adapted to be tightened against the end plate 57 in order to hold the hook 59 in proper adjusted position with relation to the member 47.

In use the trailer dolly is coupled to the frame 19 of the trailer by means of the bolts 18 and the draw bar 10 is connected to the traction vehicle by the bolts 12 extending through the cross member 11. The bar 13 will thus extend beyond the rear end of the traction vehicle as illustrated in Figure 2 so that the coupling members 14 and 20 of a conventional trailer coupling may be connected together in a conventional manner. The column 22 of the jack 21 is then adjusted to regulate the amount of weight that is transmitted by the draft tongue of the trailer on the draw bar 10, so that in most instances the major portion of the weight of the trailer will be supported on the carriage 16. It will be understood however, that by adjustment of the jack, the weight sustained by the draw bar may be varied so as to increase or decrease the tractive force of the traction wheels of the traction vehicle. With the coupling elements 14 and 20 properly joined, and the weight properly adjusted on the carriage, the links 46 are next placed in position by removing the cotter pin 54, the washer 52 and the spring 53 and projecting the hooked end 51 of the hook 50 through an opening 44 in the respective bracket 43 on the side of the vehicle to which the link is to be coupled. The opposite link is coupled in a like manner to the opposite bracket, and the ends of the links remote from the brackets 43 are next prepared by removing the cotter pins 62, the washers 61 and the springs 63, whereupon the ends 60 of the hooks 59 are thrust through the openings 45 in the cross bar 15 after which the springs, washers and cotter pins are replaced, thus forming a direct tie between each end of the cross bar 15 with the bracket 43 adjacent the respective end of the axle 35. Owing to the fact that the cup member 38 may rotate within the cup member 37 it will be evident that the axle 35 may be turned about a vertical axis in accordance with the movements of the traction vehicle, thus insuring that the trailing vehicle will properly track behind the traction vehicle when the vehicles are in forward motion. Likewise the positive coupling of the axle with the traction vehicle will prevent "jack-knifing" of the trailing vehicle when the vehicles are being driven in a reverse direction. Obviously by rotating the shaft 27 the height to which the forward end of the trailing vehicle is held above the ground may be varied and likewise the amount of weight transmitted from the trailing vehicle to the traction vehicle may be regulated.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A dolly and draft unit for a trailer which includes a draw bar adapted to be attached to a traction vehicle, a coupling element on the draw bar, a draft and supporting member adapted to be attached to the draft tongue of a trailer, a mating coupling element on the draft and supporting member for cooperation with the coupling element on the draw bar, a wheeled carriage below the draft and supporting member, means supporting the draft and coupling element for vertical adjustment relative to the carriage whereby the weight borne by the draw bar may be regulated, a cross member on the draw bar and links coupled to the cross member adjacent opposite ends and to the carriage on opposite sides of its longitudinal axis.

2. A dolly and draft unit for a trailer which includes a draw bar adapted to be attached to a traction vehicle, a coupling element on the draw bar, a draft and supporting member adapted to be attached to the draft tongue of a trailer, a mating coupling element on the draft and supporting member for cooperation with the coupling element on the draw bar, a wheeled carriage below the draft and supporting member, draft tongue cushioning means supporting the draft and coupling element for vertical adjustment relative to the carriage and said carriage being rotatable about a vertical axis which lies in a plane coincident with the plane in which lies the longitudinal axis of the trailer vehicle, a cross bar on the draw bar and links coupled to the cross bar and to the carriage to cause the carriage to turn as the cross bar moves with the movements of the traction vehicle.

GEORGE A. WARD.

REFERENCES CITED

The following references are of record in the file of this patent:

UNITED STATES PATENTS

| Number | Name | Date |
|---|---|---|
| 745,803 | Edeline | Dec. 1, 1903 |
| 2,347,524 | Swan | Apr. 25, 1944 |

FOREIGN PATENTS

| Number | Country | Date |
|---|---|---|
| 746,850 | France | June 7, 1933 |